United States Patent [19]

Boehm

[11] 4,347,768

[45] Sep. 7, 1982

[54] DRILLING TOOL FOR PRODUCING AN UNDERCUT BORE

[75] Inventor: Edgar Boehm, Bremen, Fed. Rep. of Germany

[73] Assignee: Hilti Aktiengesellschaft, Liechtenstein, Fed. Rep. of Germany

[21] Appl. No.: 54,242

[22] Filed: Jul. 2, 1979

[30] Foreign Application Priority Data

Jul. 5, 1978 [DE] Fed. Rep. of Germany ... 7820164[U]

[51] Int. Cl.³ .......................................... B23B 41/06
[52] U.S. Cl. .................................... 82/1.5; 408/180
[58] Field of Search .................... 82/1.5, 1.4; 408/159, 408/157, 155, 180; 145/124; 175/286

[56] References Cited

U.S. PATENT DOCUMENTS

| | | | |
|---|---|---|---|
| 2,236,944 | 4/1941 | Gerardi | 408/159 |
| 2,325,020 | 7/1943 | Shaw | 145/124 |
| 2,706,421 | 4/1955 | Fried et al. | 408/180 |
| 2,818,753 | 1/1958 | Leggett | 408/180 |
| 3,358,722 | 12/1967 | Berry | 82/1.5 |

FOREIGN PATENT DOCUMENTS 2331467 1/1975 Fed. Rep. of Germany ......... 82/1.5

*Primary Examiner*—Leonidas Vlachos
*Attorney, Agent, or Firm*—Toren, McGeady and Stanger

[57] ABSTRACT

A drilling tool including a central, laterally flattened primary drill adapted to produce a cylindrical main drillhole and a secondary drill, pivotally displaceable relative to the primary drill, in a laterally outward direction to produce an undercut, a sleeve which concentrically surrounds the primary drill and is axially slidable on the shaft of the primary drill against the action of a spring and a slotted link system adapted to effect pivoting of the secondary drill relative to the primary drill. The sleeve is constructed as a cage having a rear portion adapted to guide it for axial movement along the shaft, webs extend from the rear portion in the general direction of the shaft axis and leave large passages in the axial and circumferential direction, and an end ring joins the webs at their outer ends.

1 Claim, 5 Drawing Figures

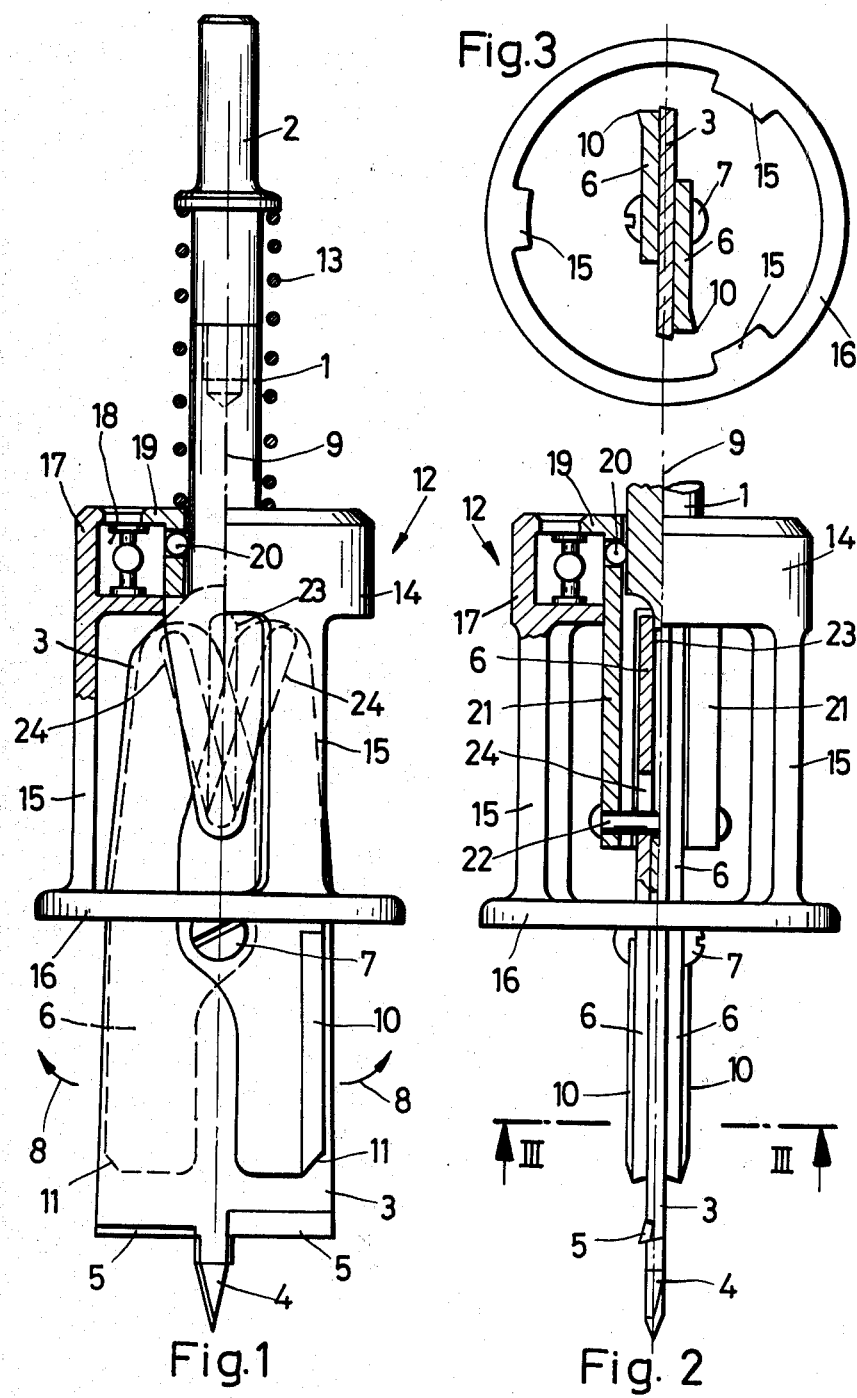

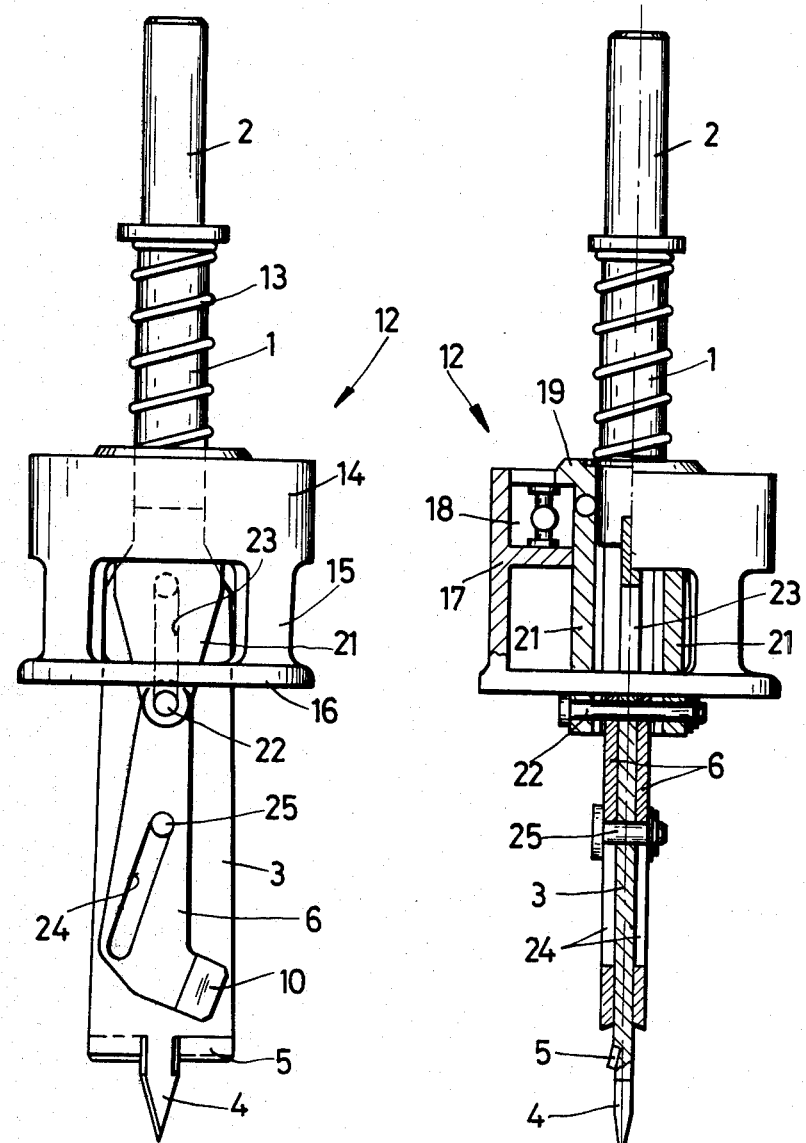

DRILLING TOOL FOR PRODUCING AN UNDERCUT BORE

This invention relates to a drilling tool for producing an undercut drillhole in soft masonary, especially gas concrete, comprising a central, laterally flattened primary drill for producing a cylindrical main drillhole and a secondary drill, pivotally displaceable relative to the primary drill, which secondary drill can be laterally pivoted outwards, to produce the undercut, from a sleeve which concentrically surrounds the primary drill and can slide axially against the force of a spring on the shaft of the primary drill, the pivoting being effected by means of a slotted link system.

Such a drilling tool, albeit for drilling in stone and hard masonry, is known, for example, from German Offenlegungsschrift 2,331,467. The drillhole produced with a drilling tool of this type, the conical portion of which diverges in the drilling direction, serves to receive positively an anchor for a fastening element which is connectable thereto. Whilst for anchoring in hard stone and masonry the frictional locking of a radially expansible dowel in general suffices, a positively locking, conical anchor has proved to be superior in lightweight building materials.

The drilling tool known from German Offenlegungsschrift 2,331,467 has, for a number of reasons, not been able to find practical acceptance. Its primary drill is unsuitable for working in lightweight building materials. Above all, the removal of the drillings is substantially impossible, even in the case of a hard material.

It is therefore the object of the invention to provide a properly functional drilling tool of the type described in the preamble above, for working in lightweight building materials, that is to say, in particular, in soft masonry, such as gas concrete.

This object is achieved, according to the invention, if the sleeve is constructed as a cage having a rear portion serving to guide it on the drill shaft, narrow webs extending from the rear portion in the general direction of the shaft axis and leaving large passages between the webs in the axial and circumferential directions, and an end ring which joins the webs at their other ends.

In this way, the drillings which build up are provided with a path of sufficiently large dimensions to the exterior even if, when starting to drill the cone, the sleeve rests against the wall or the like which forms the workpiece, without interfering with the controlling function of the sleeve.

The removal of the drillings, and the proper functioning of the sleeve (and hence of the entire drilling tool) are further improved if the front end ring (viewed in the drilling direction) of the sleeve, which serves as the engagement stop of the sleeve against the workpiece, is not constructed to be rotatable relative to the remainder of the sleeve, but instead, according to a further feature of the invention, an outer collar of the rear portion together with the webs and the end ring is mounted so as to be rotatable relative to an inner ring of the rear portion. In particular, a ball bearing race may be located between the collar and the inner ring.

Preferably, the primary drill consists of a flat core drill with a centering tip and with radially extendible cutting edges on each side of the tip. The customary forward curvature of these cutting edges ensures that the drillings are accelerated, as if by an axial centrifugal pump, towards the cage which forms the sleeve.

Further, it has proved advantageous if the secondary drill consists of two plates located one on each side of the primary drill and pivotable outwards in opposite directions. Since the primary drill is flat, the lateral offset of the two plates which form the secondary drill is immaterial in practice. On the other hand, contrary to the known drill mentioned above, with the provision of a secondary drill guided in a slot of the primary drill, there is no danger that drillings will jam the secondary drill relative to the primary drill. Furthermore, the diametrically opposed attack of the two secondary drill portions leads to a symmetrical load on the drilling tool and to a cleaner drillhole than when using the prior art secondary drill which is pivotable outwards on (only) one side.

The drawings illustrate the invention in relation to an embodiment thereof which is given by way of example, and in particular:

FIG. 1 shows a side view, partially in section, of a drilling tool;

FIG. 2 shows a side view of the drilling tool, also partially in section, but turned through 90° about the main axis relative to the view in FIG. 1;

FIG. 3 shows a view in section along line III—III in FIG. 2;

FIG. 4 shows a side view, corresponding to FIG. 1, of another embodiment; and,

FIG. 5 shows a view, corresponding to FIG. 2, of this embodiment.

The primary drill, in the form of a core drill 3, is fixed to the central shaft 1 of the drilling tool, which can be clamped by means of the shaft portion 2 in a drilling machine. The primary drill consists, as is made clear in particular by FIG. 2, of a relatively thin plate of substantially rectangular shape which, however, narrows slightly towards the rear end when viewed in the drilling direction. It carries at the front end, a centering tip 4 and, on each side thereof a radially extending cutting edge 5 which is slightly curved forwardly (FIG. 2).

On each of the two large faces of the core drill 3, a cutting edge plate 6 is mounted so as to be pivotable about the axis of a bolt 7 which passes through the core drill 3. These cutting edge plates can be pivoted outwardly in opposite directions as indicated by arrows 8, and together they form the secondary drill. Along their outwardly directed lateral edges, which in the rest position (FIG. 1) extend approximately parallel to the main axis 9 of the drilling tool, there are provided cutting edges 10 which, in cross-section, are of similar shape to the cutting edges 5 of the primary drill, and are chamfered in the region of the front ends 11.

A sleeve in the form of a cage 12 is guided on the shaft 1 so as to be slidable in the direction of the main axis 9. A compression spring 13 urges the cage 12 axially into the rest position shown in FIG. 1. The cage 12 consists of a rear portion 14, three webs 15, arranged symmetrically about the main axis 9, and an end ring 16 which joins the free ends of the webs and faces the working zone of the drilling tool (FIG. 3). This sleeve or cage 12 is preferably made of plastics material. The rear portion 14 consists of an outer collar 17, which carries the webs 15 and is mounted by means of a ball bearing race 18 so as to be rotatable relative to an inner ring 19 of the rear portion 14.

The inner ring 19 of the cage 12 locates several balls 20 which are distributed about its periphery and which co-operate with the shaft to ensure easy axial slidability of the cage 12 thereon. In the direction of the working zone of the drilling tool, the inner ring 19 is extended as a slotted sleeve, which defines, within the cage 12, two arms 21 which extend one on each side of the primary drill 3 and substantially parallel thereto. The free ends of these arms are linked by a pin 22, which passes through a longitudinal slot 23 in the primary drill 3, so that the longitudinal slidability of the cage 12 against the spring 13 on the shaft 1 is not impaired.

The pin 22 forms the control guide of the slotted link system, which controls the outward pivoting of the secondary cutting edge drill plates 6. For co-operation with the pin 22 slots 24 are provided in the plates 6 and, in the rest position of the secondary drill plates, extend at an incline to the main axis 9. Thus if the cage 12 is caused to slide on the shaft against the action of the spring 13, that is to say upwards in FIG. 1, the slots 24 co-operate with the pin 22, to cause rotation of the slotted zone towards the main axis 9, as a result of which the other ends of the plates 6 are pivoted outwards in the direction indicated by the arrows 8.

In the illustrative embodiment of FIGS. 4 and 5, it is only the construction and hinging of the secondary drill plates which is different. The pin 22 which links the arms 21 of the cage 12 in this case forms the pivot bearing for the secondary drill plates 6, which are suspended from the pin 22 by one of their ends. The pin 22 therefore passes through only one longitudinal slot 23 in the primary drill 3. The latter further carries a centrally located pin 25 which passes through the slots 24, extending at an incline to the main axis 9 in the drill plates 6 and, acting as the control guide, co-operates with these slots in the manner of a slotted link system.

In contrast to the first illustrative embodiment, the secondary drill plates 6 are in this case L-shaped and have a cutting edge extending parallel to the slot 24 so that the undercut which results is not conical, as in the first case, but instead is cylindrical. This results from the fact that in the first described embodiment of the invention, the secondary drill plates move axially with the primary drill during the undercutting but in the case of the latter embodiment, the secondary drill plates are held axially fixed during the undercutting procedure.

In this second embodiment of the invention, the secondary drill plates simply move arcuately outwardly about the pin 22 which is axially fixed relative to the cage 12, as a result of movement of the pin 25 along the slots 24 in the secondary drill plates. The latter movement results from the axial movement of the primary drill relative to the cage and thus relative to the secondary drill plates.

I claim:

1. A drilling tool for producing an undercut bore, the tool comprising:

an axially extending rotatable drive shaft;

a primary drill fixedly secured to one end of and extending axially outwardly from said drive shaft, said primary drill comprises a thin flat plate extending in the axial direction with the front end thereof extending radially of the axial direction, said front end forming a radially extending cutting edge extending transversely outwardly from both sides of the axial direction, said primary drill having a pair of opposite faces with each face having a pair of spaced axially extending edges each located on an opposite side of the axis of said drive shaft;

a secondary drill having first and second cutting members pivotally secured to at least one of the opposite faces of the primary drill and located axially rearwardly of said cutting edge such that the first and second cutting members pivot in opposite directions between a retracted position confined within the axially extending edges of the faces of the primary drill and a flared position extending radially outwardly beyond the axially extending edges of the faces of the primary drill, each of said first and second cutting members having an axially extending cutting edge located radially outwardly from said primary drill in the flared position and located axially rearwardly from the cutting edge of said primary drill;

spring means for biasing the secondary drill into the retracted position;

means for overcoming the spring means only after the drill advances axially a predetermined distance, thereby pivoting the secondary drill to its flared position and producing an undercut, the overcoming means comprises a sleeve coaxial with and encircling the drive shaft and axially movable relative to the drive shaft, first and second slots in the cutting members of the secondary drill located within the axially extending range of said sleeve when said secondary drill is in the retracted position, in the retracted position said first and second slots having first ends located closer to the cutting edge of said primary drill and second ends located further away from the cutting edge of said primary drill and said first ends located on the axis of said drill shaft and said second ends spaced radially outwardly from the axis so that said first and second slots are angled symmetrically away from the axis of the drive shaft in the direction away from the cutting edge of said primary drill, a third slot in the primary drill aligned with and extending along the axis of the drive shaft, a pin passing through the first, second, and third slots, and means for securing the pin to the sleeve, and the spring means comprises a spring for urging the sleeve in the axial direction toward the cutting edge of said primary drill.

* * * * *